(12) United States Patent
Naumburger

(10) Patent No.: US 6,459,785 B1
(45) Date of Patent: Oct. 1, 2002

(54) METHOD OF PROVIDING A DIAL-IN FUNCTION IN TELECOMMUNICATION SYSTEMS

(75) Inventor: Volkmar Naumburger, Erkner (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/228,564

(22) Filed: Jan. 12, 1999

(30) Foreign Application Priority Data

Jan. 12, 1998 (DE) .......................................... 198 00 716

(51) Int. Cl.[7] .................................................. H04M 3/42
(52) U.S. Cl. ................................. 379/214.01; 379/88.01
(58) Field of Search ........................... 379/88.01, 88.03, 379/88.04, 88.24, 156, 157, 167.01, 177, 179, 211.01, 211.02, 212.01, 214.01, 164, 165, 167.08, 181, 182

(56) References Cited

U.S. PATENT DOCUMENTS

| | | | |
|---|---|---|---|
| 4,696,028 A | | 9/1987 | Morganstein et al. |
| 4,783,796 A | * | 11/1988 | Ladd .......................... 379/67.1 |
| 4,922,526 A | * | 5/1990 | Morganstein et al. ....... 379/157 |
| 4,926,462 A | * | 5/1990 | Ladd et al. ................. 379/67.1 |
| 5,515,422 A | | 5/1996 | MeLampy et al. |
| 5,581,604 A | | 12/1996 | Robinson et al. |
| 5,604,791 A | * | 2/1997 | Lee ............................... 379/67 |
| 5,623,537 A | * | 4/1997 | Ensor et al. .................... 379/67 |
| 5,978,451 A | * | 11/1999 | Swan et al. ............... 379/88.24 |
| 6,195,424 B1 | * | 2/2001 | Young ......................... 379/210 |

FOREIGN PATENT DOCUMENTS

| | | |
|---|---|---|
| EP | 0 330 441 | 8/1989 |
| WO | WO 93/20639 | 10/1993 |

OTHER PUBLICATIONS

*Brennan, P., et al., "Talking to Technology", Telesis, 1988, vol. 15, No. 1, pp. 45–50.

* cited by examiner

*Primary Examiner*—Scott L. Weaver
(74) *Attorney, Agent, or Firm*—Kenyon & Kenyon

(57) ABSTRACT

A method and a device are described for providing or simulating a direct dial-in function by providing an extension dialing function in telecommunication systems that have no direct dial-in capability with dedicated extension numbers. The dial-in capability is implemented in that an incoming call is automatically received by the TC system, the user is automatically prompted, via an audio user message, to input extension dialing commands, these extension dialing commands are automatically assigned to an extension and with this assignment information an electronic forwarding signal is generated, which causes the TC system to switch the incoming connection to an extension. This forwarding signal simulates the control signal generated in manual forwarding between the extensions of the TC system. The device for performing the method is integrated as a circuit arrangement in a TC system or designed as an adaptive device retrofitted on existing TC systems.

18 Claims, 3 Drawing Sheets

METHOD OF PROVIDING A DIAL-IN FUNCTION IN TELECOMMUNICATION SYSTEMS

FIELD OF THE INVENTION

The present invention relates to a method of providing a dial-in function in telecommunication systems (TC systems) that have no direct dial-in capability to extensions using dedicated extension numbers.

RELATED TECHNOLOGY

TC systems for home use are usually connected to a single exchange terminal and distribute incoming calls according to a fixed-programmed scheme to the extension terminals of the TC system. In this manner, incoming calls may be forwarded to all extensions or to a single pre-selected extension, for example. Differentiated forwarding using extension dialing with an extended number has not been possible. This situation was remedied, to a certain extent, by the introduction of the ISDN feature MSN (multi-subscriber number), where a minimum of three and a maximum of 12 numbers are assigned to one ISDN access terminal. This method, however, assumes the presence of ISDN access lines and involves extra costs when more than three numbers are used.

Another disadvantage of the related art is that when a connection cannot be established because none of the extensions answers the call (absence), a message can only be left if an answering machine has been connected to the TC system.

SUMMARY OF THE INVENTION

Therefore, an object of the present invention is to make possible direct dial-in with TC systems having no direct dial-in capability. The present invention provides both a method and a device to accomplish this object.

The present invention provides a method for establishing a dial-in function in communication systems (TC systems) that have no direct dial-in capability to extensions using dedicated extension numbers with the following features:

1.1 An incoming telecommunication call is automatically received by the TC system.
1.2 An audio user guide refers the caller to the direct dialing or extension dial-in function and prompts the user to enter extension dialing commands.
1.3 The extension dialing commands are multifrequency-coded signals or signals entered via voice, which contain an identifier uniquely assigned to an extension to be dialed, such as the extension number or the name of the user of the corresponding terminal device.
1.4 The extension dialing command entered is transmitted to the TC in the same way as a voice signal.
1.5.1 The extension dialing command input as a multifrequency-coded signal is converted into an electronic forwarding signal containing an electronic identifier of the extension to be dialed, or
1.5.2 The extension dialing command input as a voice command is converted into an electronic forwarding signal by associating the voice pattern with a predefined voice pattern associated with the extension, and an electronic forwarding signal containing an electronic identifier of the extension to be dialed is generated.
1.6 Manual forwarding via input of a keyboard command at a terminal device of the TC system is electronically simulated by the forwarding signal and thus causes the TC system to route the connection to the extension corresponding to the extension dialing command.

Furthermore, the present invention provides a device for establishing a dial-in function in communication systems (TC systems) that have no direct dial-in capability characterized by:

5.1 a sequencing control (3, 3') and
5.2 a recognition unit (4, 4', 4"),
with
5.1.1 the sequencing control (3, 3') emitting a control signal upon receiving a call, which causes the TC system to establish the connection;
5.1.2 the sequencing control (3, 3') causing caller text prompts, stored in a memory (5') for voice components, to be output to the caller;
5.1.3 and the sequencing control (3, 3') converting the control signal transmitted by the recognition unit (4, 4', 4") and containing an electronic identifier of the extension to be dialed, into a forwarding signal, which corresponds to the signal generated in manual forwarding within the TC system; and with
5.2.1 the recognition unit (4, 4', 4") containing a multifrequency receiver (21), which converts the extension dialing command input as a multifrequency-coded signal, which contains the identifier of the extension selected in electronic form, into a control signal, and transmits it to the sequencing control;
or
5.2.2 the recognition unit (4, 4', 4") containing a voice recognition device (22), which compares the voice signal corresponding to the extension dialing command input as a voice command with a predefined voice pattern associated with a given extension and stored in a memory in a digital form, assigns the extension whose associated voice pattern has the greatest agreement with the voice signal to the extension dialing command or the voice command, and generates a control signal containing an electronic identifier of this recognized extension and forwards it to the sequencing control.

The sequencing control emits a control signal causing the TC system to establish a connection with the caller when an incoming call is received. After the connection has been established, the sequencing control causes text prompts, stored in a voice module memory, to be output. These voice modules refer the caller to the extension dialing function and prompt the user to input the appropriate extension dialing commands. The text prompts are preferably user-defined with the caller being told which person can be reached at which extension and what extension dialing command should be input for this purpose. The extension dialing command can be input as a multifrequency-coded signal generated via keyboard (i.e., phone number button) entry at the caller's terminal and forwarded to the TC system called in the same way as a voice signal. As an alternative, the extension dialing command can be a voice signal, i.e., spoken words, which are also transmitted, in a known manner, to the TC system. To receive and convert these multifrequency-coded signals or voice signals, the recognition unit has a multifrequency receiver and/or a voice recognition unit.

The multifrequency receiver converts the signal input as a multifrequency-coded signal into an electronic control signal, which is usually a digital signal, in a known manner and transmits it to the sequencing control. Since the extension dialing commands contain an identifier uniquely assigned to an extension to be dialed, the converted control signal also contains the identifier of the extension dialed in electronic form.

In the case of extension dialing commands, the extension dialing command is sent to the voice recognition unit as a voice signal, preferably after being digitized and compared there with the predefined voice pattern stored in a memory in a digital form and associated with an extension. The extension whose associated voice pattern shows the highest degree of agreement with that of the extension dialing command is then assigned to the extension dialing command. The voice recognition unit forwards the result of the recognition, in electronic form as a control signal, usually a digital signal, to the sequencing control. The sequencing control converts the signal transmitted by the voice recognition unit, which contains an electronic identifier of the extension to be dialed, into a forwarding signal. This forwarding signal is selected so that it corresponds to the signal that is generated within the TC system when forwarding is done manually. This forwarding signal also includes the "switch through" control signal and the extension number that has been recognized. With such a device an extension dialing function is provided according to the present invention and thus a dial-in function is simulated with the connection being forwarded or established by the TC system in a known manner after it has received the forwarding signal. The switching matrix of the TC system grounds the incoming external call, for example, attempts to establish a connection with the desired extension, and links the external connection to the connection of the extension if the phone is picked up at that extension.

In a refinement of the method, the original status prior to forwarding is automatically re-established if the forwarded connection is not answered within a predefined period of time or after a predefined number of rings, i.e., the extension does not respond. Then the steps of communication and prompting for extension dialing by inputting a certain extension identifier and/or the name of the person assigned to a certain extension, extension dialing command transmission, conversion into an electronic forwarding signal and establishing the connection to the extension corresponding to the extension dialing command are performed again. The extension to be dialed can also be an answering machine.

In another embodiment of the method, the original status that existed prior to forwarding is re-established if the forwarded connection is not answered, and the connection is automatically forwarded to an answering machine or an answering function.

According to an advantageous embodiment of the present invention, the answering machine memory is divided into storage areas assigned to the individual extensions. The extension for which a message is to be left can be selected by the caller by inputting a multifrequency-coded signal or a voice signal, which is converted into an electronic control signal by the recognition unit as described above and evaluated by the sequencing control. As an alternative, the message can be automatically referred to the extension to which the connection was unsuccessfully forwarded previously when the answering machine component is activated.

For security, the storage areas of the answering machine memory can be accessed from the associated extension and from other extensions after the input of an access code (PIN).

The device according to the present invention can be an integral part of a TC system, i.e., can be implemented directly in the TC system as a circuit arrangement.

However, in order to allow existing TC systems to be retrofitted with a dial-in/extension dialing function, it is advantageous if the device is designed as a module that is independent of the TC system and contains the above-described circuit arrangement. In this case the device has an interface for connection to an extension terminal of a TC system and can thus be functionally coupled to the TC system. The device is thus connected to an extension terminal of the TC system as any other terminal device such as a telephone or an answering machine. Signals are transmitted and, if required, power is supplied in the known manner via this interface. When used, this device is connected to the extension to which incoming calls are automatically routed. The TC system should in this case be programmed so that incoming calls to all the other extensions are not directly routed, but only through the device according to the present invention.

It is furthermore advantageous if the circuit arrangement according to the present invention is integrated in a telephone, with the dial-in function activated, as in the case of an answering machine, unless the connection is directly established by a user by manually answering the call at the terminal after a predefined number of rings.

According to the present invention, in TC systems that have no direct dial-in capability to the extensions via their dedicated numbers, a dial-in function can be simulated by providing an extension dialing function.

DETAILED DESCRIPTION

Figure 1:
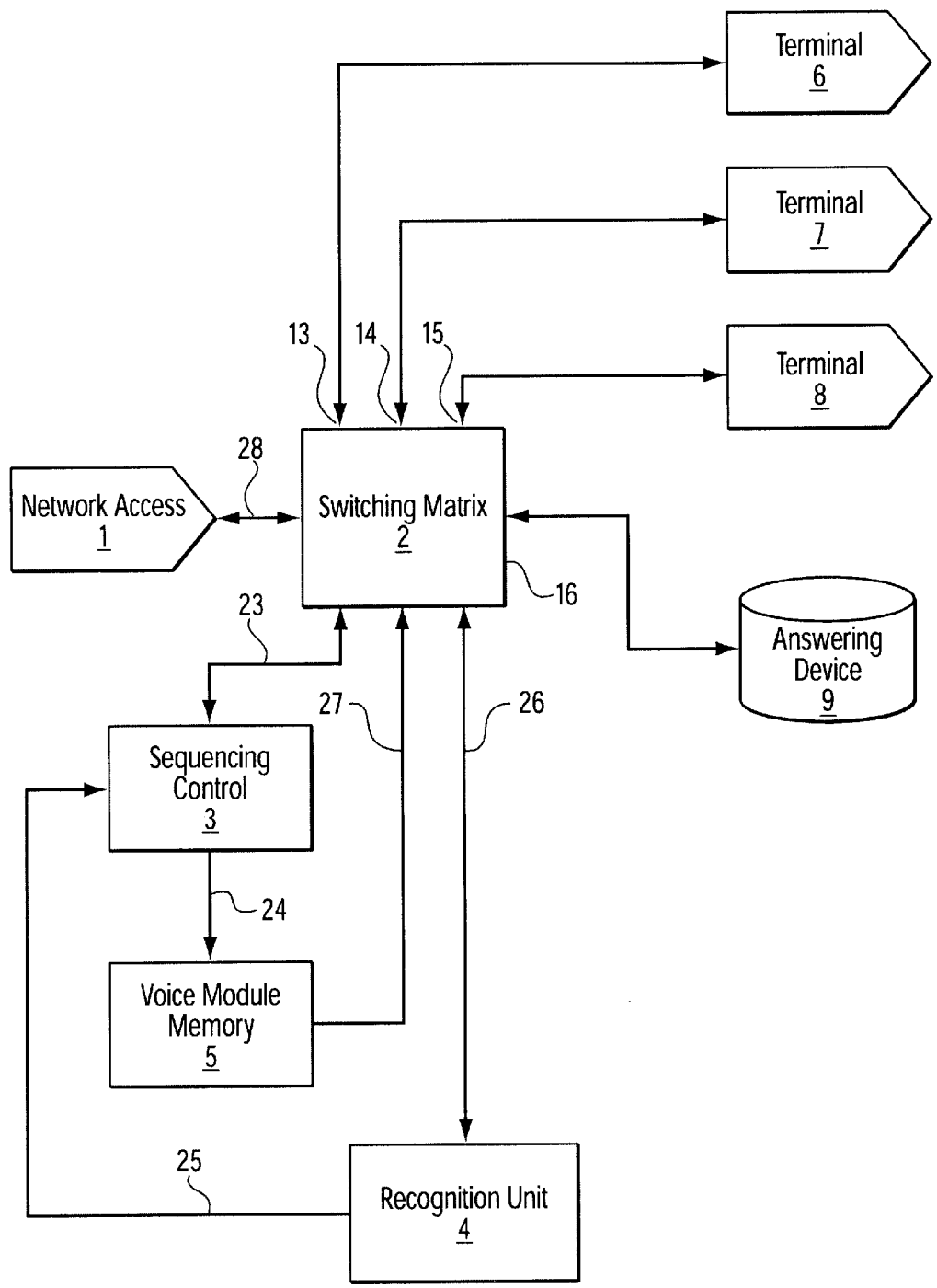
FIG. 1 shows a block diagram of a TC system with an integrated device for simulating a dial-in function.

FIG. 1 shows a block diagram of a TC system in which a device according to the present invention is implemented to simulate a dial-in function. The individual components are functionally coupled as indicated by the arrows with the direction of the arrows indicating the direction of the information flow.

The TC system has, in a known manner, a telephone network access terminal 1 and a switching matrix 2. The functions of switching matrix 2 are controlled by a sequencing control 3, which in this embodiment controls the normal functions of the TC system and helps the method according to the present invention to be performed. Control signals are bidirectionally transmitted between sequencing control 3 and switching matrix 2 via an appropriate control channel 23.

The TC system has four extension terminals 13, 14, 15, 16, to which three extensions 6, 7, 8 and an answering machine 9 are connected. In the case of a conventional TC, an incoming call goes via network access 1 to switching matrix 2. Sequencing control 3 determines to which of extension terminals 13, 14, 15, 16 the call should be forwarded, i.e, to which terminals 6, 7, 8 or answering machine 9 the control signals indicating the incoming call should be forwarded. If the terminal devices at the extension are telephones, a ring signal will sound. If the respective terminal device is activated, e.g., the phone is picked up, the connection between the outside call and the terminal device is established. Then voice and other information can be transmitted between the outside caller and the terminal device.

The simulation of a dial-in function and the implementation of an extension dialing function with the circuit arrangement according to the present invention takes place as follows:

The TC system is connected to the telephone test network in a known manner via network access terminal 1. Initially the incoming call is received by the internal switching matrix 2 activated by sequencing control 3. To do so, sequencing control 3 receives a signal from switching matrix 2, which shows an incoming call; it then transmits a control signal via data line 23, causing switching matrix 2 to receive the call.

Sequence control 3 also causes text prompts to be output from a voice module memory 5, using control signals transmitted over data line 24. For this purpose, a connection is first established between voice module memory 5 and switching matrix 2 and thus with the outside caller, so that the voice information can be transmitted. The text prompts are preferably user-defined and stored in the voice module memory in digital form. This voice information is sent directly to the switching matrix 2 over data line 27 and can thus be received by the remote caller as an audio signal. Sequencing control 3 has meanwhile set switching matrix 2 so that the prompt text is transmitted to the remote caller. Operating instructions for extension dialing are transmitted to the remote caller via the prompts. The caller is prompted to input certain extension dialing commands containing an identifier of the extension to be dialed. For this purpose, the caller is preferably told which station can be reached with which identifier or with which keyboard command.

After the welcoming message and user prompts, the connection between voice module memory 5 and switching matrix 2 is interrupted and a connection is established between switching matrix 2 and recognition unit 4. As an alternative, simultaneous connections remain between voice module memory 5 and/or recognition unit 4 and switching matrix 2. This has the advantage that the user familiar with the extension dialing function can input the extension dialing commands without waiting for the full welcoming text to be completed.

Figure 3:
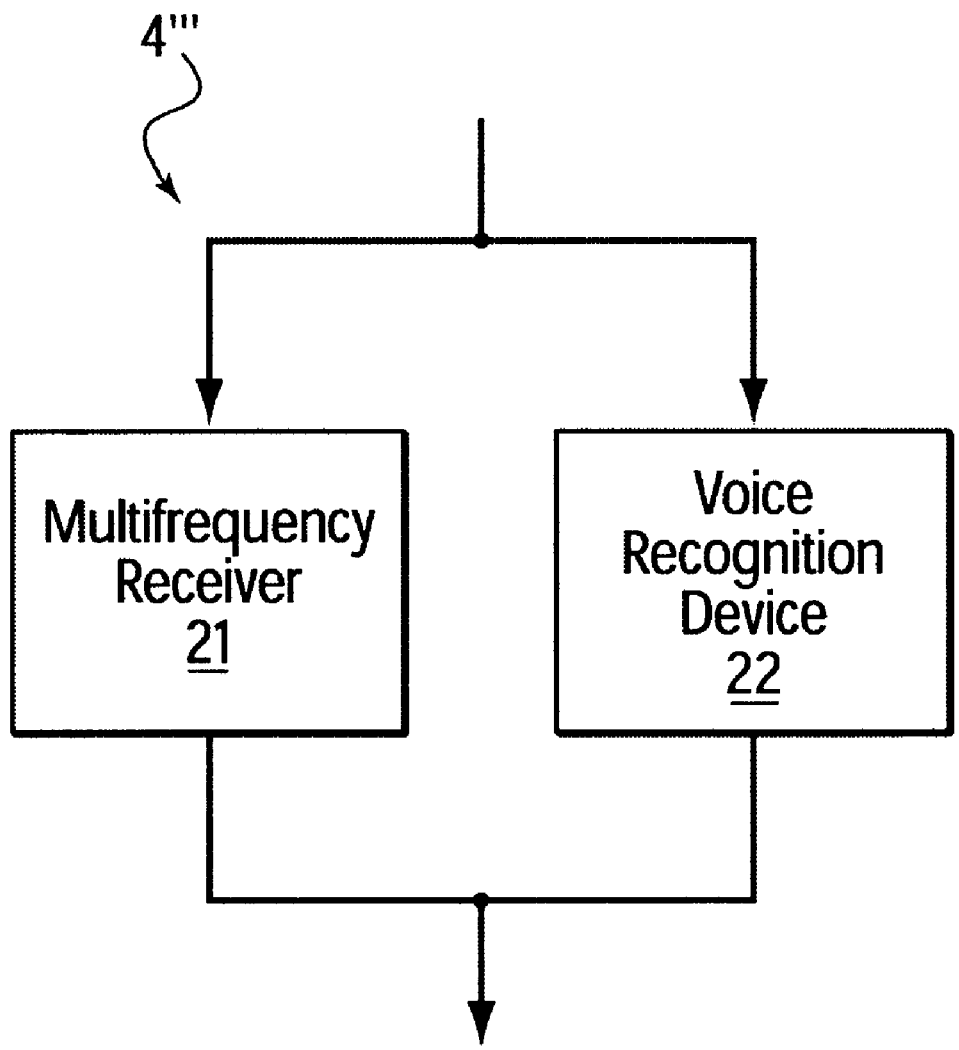
FIG. 3 schematically shows a recognition unit with a voice recognition device and a multifrequency receiver connected in parallel.

Information received by the TC system via data line 28 is transmitted to recognition unit 4 via data line 26. Thus the extension dialing commands input by the caller are transmitted to recognition unit 4 and can be identified by recognition unit 4, which contains a multifrequency receiver or a voice recognition device or, as FIG. 3 shows, both elements. Signals capable of being identified and processed by the recognition unit can be used as extension dialing commands. A multifrequency-coded signal such as a DTMF signal is converted, in a known manner, into a digital electronic control signal, which is transmitted to sequencing control 3. In a similar manner, in the case of a voice recognition unit, a voice signal is compared to a predefined voice pattern learned in a training phase. The voice recognition unit is preferably a phoneme-based speaker-independent voice recognition unit, for example, an HMM voice recognition unit. Identifiers of a certain extension are assigned to predefined voice patterns. The identifier of the identified voice pattern is transmitted, as a digital electronic control signal, by recognition unit 4 to sequencing control 3. Thus the sequencing control has the information about the extension to be dialed available in both cases. The electronic control signal generated by recognition unit 4 is either the number of the extension to be dialed or must be uniquely associated with it.

Then the sequencing control generates, using the number of the extension to be dialed, a forwarding signal, which is transmitted via data line 23 to switching matrix 2. This signal is identical to the one generated in the case of manual forwarding from a terminal device connected to an extension to another terminal device within the same TC system. The forwarding signal causes a connection to be established to the extension to be dialed and this connection to be linked to the existing connection to the remote caller. While the connection is being established within the TC system to the extension dialed, the external connection is usually grounded, and on-hold music or the like is played for the caller. Thus the a dial-in function is provided for the remote caller.

If the connection established to the extension dialed is not answered within a given number of rings, the connection from switching matrix 2 to the extension dialed is interrupted again. The caller is then routed again by a control signal generated by sequencing control 3 from switching matrix 2 to an answering machine 9. As an alternative, the extension dialing function is made available again; controlled by sequencing control 3, the remote caller is prompted by voice modules to select another extension, the extension dialing commands input being processed as described above and resulting in a forwarding signal being generated. Then the caller can be connected directly to answering machine 9 if it is installed.

Figure 2:
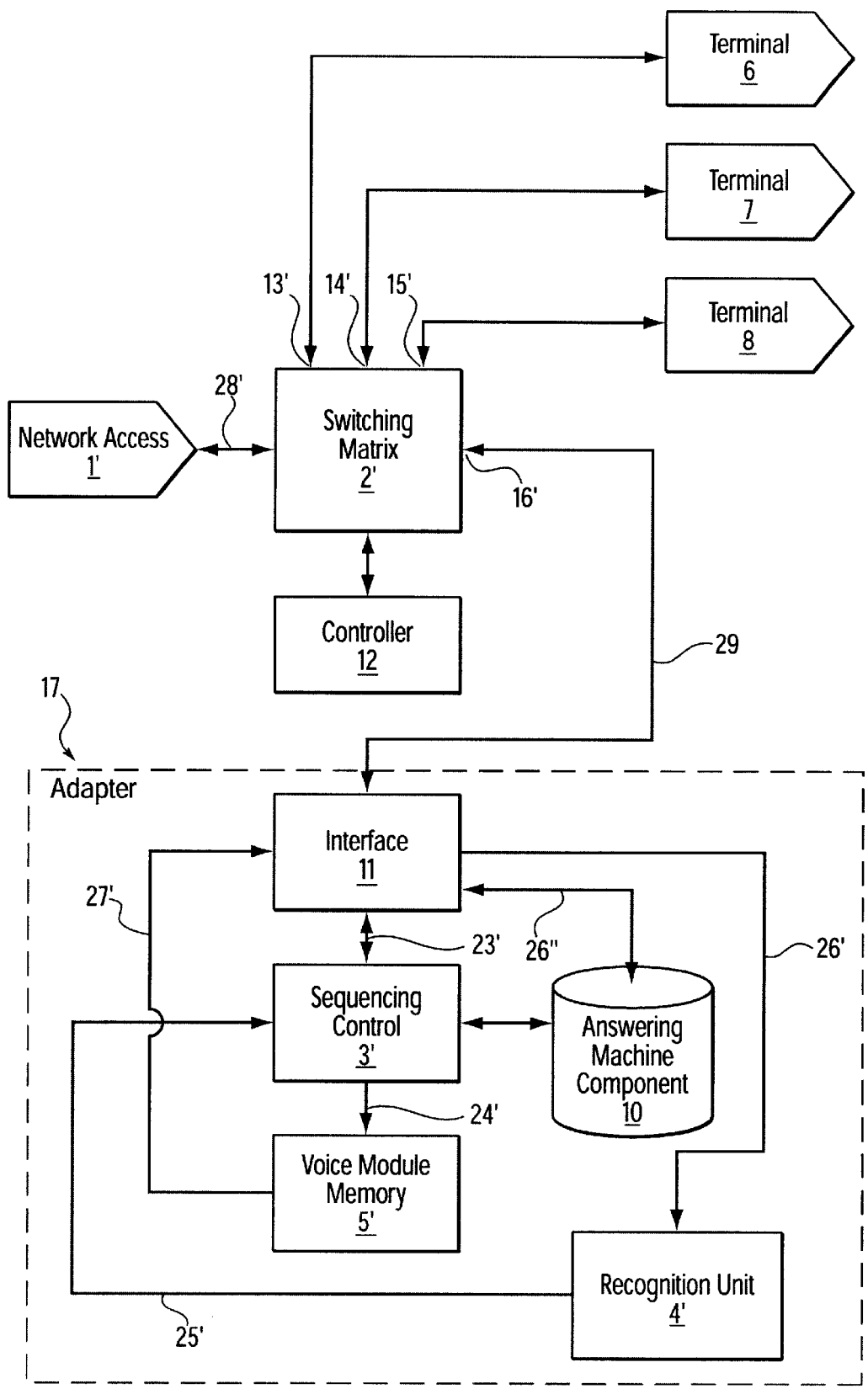
FIG. 2 shows a block diagram of a TC system with a separate device, connected to an extension terminal, for simulating a dial-in function.

FIG. 2 shows the embodiment of device 17 according to the present invention as an adaptive design, which can be connected to an extension terminal 16' of a TC system. The TC system remains structurally unchanged, so that known existing systems can be retrofitted with an extension dialing function using adapter 17 according to the present invention. The components of the TC system are schematically illustrated in the upper portion of FIG. 2, and adapter 17 in the lower portion of FIG. 2 with the coupling of the individual components indicated with arrows. The operation of the individual components is basically identical to that of the device illustrated in FIG. 1; the sequencing control function from FIG. 1 is taken over in the device shown in FIG. 2 by sequencing control 3' of the adapter and controller 12 of the TC system. Controller 12 controls the functions of the TC system such as answering calls, switching between extensions and establishing connections in a known manner. Sequence control 3' controls the functions of adapter 17 according to the present invention, which includes the following components: sequencing control 3', recognition unit 4', voice module memory 5', answering machine component 10, interface 11, and data lines 23' through 27' between the individual components.

The TC system illustrated in FIG. 2 has four extension terminals 13', 14', 15', 16'; conventional extensions 6, 7, 8 are connected to three of them. Device 17 according to the present invention is connected to extension terminal 16' of the TC system as an external device. Data is transmitted between the TC system and adapter 17 via a conventional data line 29, designed for transmitting voice and control signals. Signals can be transmitted via separate voice and control channels, but also via a common channel, distinction between control information and payload information being made by the type of signal. In the latter case, control signals may be multifrequency-coded signals, for example, which are transmitted as voice.

In order to simulate the dial-in function, all external calls must be first forwarded to extension terminal 16' and thus to adapter 17. Controller 12 is programmed so that it causes switching matrix 2 to switch all incoming calls in this manner first. An incoming connection is routed to adapter 17 via interface 11. The information transmitted over data line 29 is sent, via interface 1, to the downstream units: sequencing control 3' and recognition unit 4' via data lines 23' and 26', respectively. Sequencing control 3' processes the control information contained in the transmission signal, and recognition unit 4' processes the voice information contained in the transmission signal.

Sequencing control 3' sends, via interface 11. a control signal to the TC system, which indicates the establishment of the connection. At the same time, sequencing control 3' causes text prompts to be output from voice module memory 5', which are sent via data line 27' to interface 11 where they are injected in electronic form in data line 29 as voice signals. The connection from voice module memory 5' to switching matrix 2' is connected to the outside call; thus the caller can receive the prompt text as audio signals.

The extension dialing commands input by the caller are injected into the connection between switching matrix 2' and adapter 17 over the incoming connection, as shown above. In interface 11, the incoming voice signals are sent to the input of recognition unit 4'. Recognition unit 4' delivers a recognition result as shown above, which is transmitted via data line 25' to sequencing control 3'. Sequencing control 3' generates a forwarding signal, which is transmitted to the TC system via interface 11. Controller 12, upon receipt of this forwarding signal, causes switching matrix 2' to establish a connection to the extension dialed. When this connection has been established, the connection existing over telephone network access 1' is linked to the connection from switching matrix 2' to the selected extension. The connection from switching matrix 2' to adapter 17 is interrupted. Thus the external caller can be automatically connected to an available extension with the help of adapter 17.

If the extension dialed does not respond, i.e., no connection can be established by switching matrix 2' to this extension, then the user is prompted by sequencing control 3', via the output of appropriate text prompts from voice module memory 5', to enter a new extension dialing command. The outside connection, waiting for forwarding, is caused by a control signal from sequencing control 3', to be ungrounded for that purpose and reconnected to the adapter. This extension dialing command can also be issued by selecting an answering machine connected to another extension or an answering machine component 10 integrated in the adapter. As an alternative, the call is directly routed to answering machine component 10 without informing the remote caller again. For this purpose, the adapter has a data line 26" from interface 11 to answering machine component 10, through which the answering machine component is connected in parallel to recognition unit 4'. This data line 26" can be used both for receiving messages from, and leaving messages on, the answering machine.

The answering machine memory is preferably divided into areas where messages are stored according to the corresponding extension.

FIG. 3 shows the design of recognition unit 3'. It has a multifrequency receiver 21 and a voice recognition device 22, which are connected in parallel. The inputs of both components 21, 22 are connected to the voice channel of the TC system. The caller can thus input extension dialing commands both as multifrequency-coded signals and voice signals. The extension dialing commands input are sent to multifrequency receiver 21 and voice recognition device 22, with the component matching the type of signal input delivering a recognition result. The other component delivers no signal.

According to another preferred feature, the sequencing control prompts the user to input a new extension dialing command if the recognition unit was unable to identify an extension dialing command.

What is claimed is:

1. A method of providing a dial-in function in a telecommunications system having no direct dial-in capability to extensions of the telecommunications system the telecommunications system having a terminal device, the extensions having extension numbers, the method comprising:

automatically receiving in the telecommunications system an incoming telecommunications call by a caller;

accessing an audio user guide to refer the caller to a direct dialing or extension dial-in function and to prompt the caller to enter an extension dialing command;

transmitting an entered extension dialing command entered by the caller to the telecommunications system, the entered extension dialing command being multifrequency-coded signals corresponding to an identifier for a to-be-dialed extension of the extensions, converting the entered extension dialing command into an electronic forwarding signal containing an electronic identifier of the to-be-dialed extension; and electronically simulating manual forwarding via input of a keyboard command at the terminal device by the forwarding signal so that the telecommunications system routes the telecommunications call to the to-be-dialed extension associated with the entered extension dialing command.

2. The method as recited in claim 1 wherein one of the extensions corresponds to an answering machine.

3. The method as recited in claim 1 further comprising re-performing the accessing step if, after the simulated manual forwarding, the desired extension does not answer the telecommunications call within a predefined period of time or a predefined number of rings.

4. The method as recited in claim 1 further comprising forwarding the telecommunications call to an answering machine or performing an answering machine function if, after the simulated manual forwarding, the desired extension does not answer the telecommunications call within a predefined period of time or a predefined number of rings.

5. The method as recited in claim 1 wherein the identifier is one of the extension numbers or a name of a user of a corresponding terminal device.

6. A method of providing a dial-in function in a telecommunications system having no direct dial-in capability to extensions of the telecommunications system the telecommunications system having a terminal device, the extensions having extension numbers the method comprising:

automatically receiving in the telecommunications system an incoming telecommunications call by a caller;

accessing an audio user guide to refer the caller to a direct dialing or extension dial-in function and to prompt the caller to enter an extension dialing command;

transmitting an entered extension dialing command entered by the caller to the telecommunications system, the entered extension dialing command being voice signals corresponding to an identifier for a to-be-dialed extension of the extensions, converting the entered extension dialing command into an electronic forwarding signal by associating the voice signals with a predefined voice pattern associated with the to-be-dialed extension and providing an electronic identifier of the to-be-dialed extension; and electronically simulating manual forwarding via input of a keyboard command at the terminal device by the forwarding signal so that the telecommunications system routes the telecommunications call to the to-be-dialed extension associated with the entered extension dialing command.

7. The method as recited in claim 6 wherein one of the extensions corresponds to an answering machine.

8. The method as recited in claim 6 further comprising re-performing the accessing step if, after the simulated manual forwarding, the desired extension does not answer the telecommunications call within a predefined period of time or a predefined number of rings.

9. The method as recited in claim 6 further comprising forwarding the telecommunications call to an answering machine or performing an answering machine function if, after the simulated manual forwarding, the desired extension does not answer the telecommunications call within a predefined period of time or a predefined number of rings.

10. The method as recited in claim 6 wherein the identifier is one of the extension numbers or a name of a user of a corresponding terminal device.

11. A device for performing method of providing a dial-in function in a telecommunications system having no direct dial-in capability to extensions of the telecommunications system, the telecommunications system having manual forwarding signals for forwarding calls within the telecommunications system, the extensions having dedicated extension numbers, the device comprising:

a sequencing control unit for emitting a first control signal upon receiving a call by a caller, the first control signal causing the telecommunications system to establish a connection;

a memory for storing caller prompts, the sequencing control unit capable of accessing the memory so that the caller prompts can be output to the caller;

a recognition unit providing an input control signal containing an electronic identifier of a to-be-dialed extension of the extensions to the sequencing control unit, the sequencing control unit converting the input control signal into a forwarding signal corresponding to a manual forwarding signal of the manual forwarding signals, the recognition unit containing at least one of:

a multifrequency receiver for converting a first extension dialing command input by the caller as a multifrequency-coded signal into the input control signal; and a voice recognition device for associating a voice signal corresponding to a second extension dialing command input by the caller as a voice command with a predefined voice pattern associated with the to-be-dialed extension and for forming the input control signal, the predefined voice pattern being stored in a digital form.

12. The device as recited in claim 11 wherein the device is integral with the telecommunications system.

13. The device as recited in claim 11 further comprising an interface for connection to an extension terminal of the telecommunications system.

14. The device as recited in claim 11 wherein the device is integral with a telephone, the dial-in function being activated when after a predefined number of rings or within a predefined period of time the connection has not been established directly at the terminal device by manual answering of the call.

15. The device as recited in claim 11 further comprising an integral answering machine component.

16. The device as recited in claim 15 wherein the answering machine is divided into areas assigned to a first and a second extension of the extensions.

17. The device as recited in claim 16 wherein the areas of the answering machine are capable of being accessed remotely through a PIN access code.

18. The device as recited in claim 11 wherein the voice recognition device is a speaker-independent, phoneme-based voice recognition device.

* * * * *